US009802564B2

(12) United States Patent
Maurer et al.

(10) Patent No.: US 9,802,564 B2
(45) Date of Patent: Oct. 31, 2017

(54) METHOD AND SYSTEM FOR ALLEVIATING THE CONSEQUENCES OF A COLLISION

(71) Applicant: Dr. Ing. h.c. F. Porsche Aktiengesellschaft, Stuttgart (DE)

(72) Inventors: Simon Alexander Maurer, Stuttgart (DE); Nino Andricevic, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/149,682

(22) Filed: May 9, 2016

(65) Prior Publication Data

US 2017/0028953 A1 Feb. 2, 2017

(30) Foreign Application Priority Data

Jul. 30, 2015 (DE) .................. 10 2015 111 154

(51) Int. Cl.
*B60R 21/0132* (2006.01)
*B60G 17/0195* (2006.01)
*B60R 21/00* (2006.01)

(52) U.S. Cl.
CPC ...... *B60R 21/0132* (2013.01); *B60G 17/0195* (2013.01); *B60G 2800/012* (2013.01); *B60G 2800/222* (2013.01); *B60G 2800/9122* (2013.01); *B60G 2800/9124* (2013.01); *B60R 2021/0018* (2013.01)

(58) Field of Classification Search
CPC ........ B60R 21/0132; B60R 2021/0018; B60G 17/0195; B60G 2800/012; B60G 2800/222; B60G 2800/9124; B60G 2800/9122
See application file for complete search history.

(56) References Cited

U.S. PATENT DOCUMENTS

| 6,438,464 | B1 * | 8/2002 | Woywod | ............ | B60G 17/0162 701/1 |
|---|---|---|---|---|---|
| 8,322,728 | B2 * | 12/2012 | Hirao | .................. | B60G 17/015 280/5.506 |
| 2005/0149240 | A1 * | 7/2005 | Tseng | .................. | B60G 17/016 701/38 |
| 2008/0284574 | A1 | 11/2008 | Bosch | | |

(Continued)

FOREIGN PATENT DOCUMENTS

| DE | 10332935 | 2/2005 |
|---|---|---|
| DE | 10352212 | 2/2005 |
| DE | 102004017634 | 10/2005 |

(Continued)

OTHER PUBLICATIONS

German Search Report for German Application No. 10 2015 111 154.3 dated Dec. 8, 2015, with partial English language translation.

*Primary Examiner* — Drew J Brown
(74) *Attorney, Agent, or Firm* — RatnerPrestia

(57) ABSTRACT

A method for alleviating the consequences of a collision of a vehicle, having a front axle and/or a rear axle with at least one roll stabilization device with which torques can be applied in the region of the front axle and/or the rear axle for the purpose of roll stabilization. In order to alleviate the consequences of collisions of vehicles, in the event of a collision protective torques are generated using the roll stabilization devices.

9 Claims, 3 Drawing Sheets

(56) References Cited

U.S. PATENT DOCUMENTS

2009/0099734 A1* 4/2009 Le .................... B60R 21/0132
701/46

FOREIGN PATENT DOCUMENTS

| DE | 102010010869 | 9/2011 |
| DE | 102011105490 | 12/2012 |
| DE | 102013021485 | 7/2014 |

* cited by examiner

METHOD AND SYSTEM FOR ALLEVIATING THE CONSEQUENCES OF A COLLISION

CROSS-REFERENCE TO RELATED APPLICATION

This application claims priority to German Patent Application No. DE 10 2015 111 154.3, filed Jul. 30, 2015, which is incorporated by reference herein in its entirety.

FIELD OF THE INVENTION

The invention relates to a method and a system for alleviating the consequences of a collision of a vehicle which comprises a front axle and/or a rear axle with at least one roll stabilization device with which opposing torques can be applied for the purpose of roll stabilization in the region of the front axle and/or the rear axle and as a result the consequences of crashes are reduced.

BACKGROUND OF THE INVENTION

German laid-open patent application DE 10 2013 021 485 A1, which is incorporated by reference herein, discloses a method for alleviating the consequences of a collision of a vehicle with a further vehicle, wherein a vehicle level of the vehicle is set as a function of a determined vehicle level of the further vehicle, wherein in addition a horizontal degree of overlap between a deformation area of the vehicle and the further vehicle is determined and an automatic steering intervention for increasing the horizontal degree of overlap is carried out as a function of the determined horizontal degree of overlap. German patent DE 103 32 935 B4, which is incorporated by reference herein, discloses a motor vehicle having a pre-safe system which comprises at least one vehicle-surrounding detection device and a suspension and damping device which is arranged between a vehicle chassis and bodywork and can be actuated as a function of the signals which are received by the vehicle-surroundings-detection device and evaluated in a data-evaluation device, wherein the data-evaluation device of the vehicle-surroundings-detection device is linked to a control unit of an active chassis controller which actuates the suspension and damping device and by means of which a torque which counteracts a tipping moment of the motor vehicle in the direction of the collision object is applied in a pre-crash phase when an impact of a collision object on a side sill area is to be expected, wherein an adjustment time for the adjustment of the vehicle ride level is variable as a function of relative speed with respect to the collision object.

SUMMARY OF THE INVENTION

Described herein is a method and device to alleviate the consequences of collisions of vehicles which comprise a front axle and a rear axle with roll stabilization devices with which opposing torques can be applied for the purpose of roll stabilization in the region of the front axle and the rear axle.

The method for alleviating the consequences of a collision of a vehicle which comprises a front axle and a rear axle with roll stabilization devices with which opposing torques can be applied in the region of the front axle and the rear axle for the purpose of roll stabilization, is achieved in that in the event of a collision protective torques, which alleviate the consequences of collision, are generated using the roll stabilization devices. Within the scope of the method, for example conventional roll stabilization devices are used in order to generate the protective torques which differ from conventional opposing torques which counteract the rolling torque.

One preferred exemplary embodiment of the method is characterized in that in the event of an asymmetrical collision alternating torques are generated in the region of the front axle and the rear axle using the roll stabilization devices, which alternating torques have directions of action which are opposed with respect to a rolling axle and which counteract torsion of the vehicle owing to a collision. As a result, in the event of an asymmetrical collision, undesired deformation of the vehicle bodywork can be advantageously reduced.

A further preferred exemplary embodiment of the method is characterized in that in the event of head-on collision a protective torque is applied in the region of the front axle using the roll stabilization devices, which protective torque is opposed to a protective torque which is applied in the region of the rear axle. In the event of the head-on collision, in particular in the event of an asymmetrical head-on collision, the bodywork of the vehicle can be twisted about its longitudinal axis and/or about its rolling axle. The protective torques which were applied using the roll stabilization devices counteract this twisting.

A further preferred exemplary embodiment of the method is characterized in that the protective torques have the same directions of action in the region of the front axle and of the rear axle. As a result, for example better overlap with respect to a crash barrier can advantageously be provided.

A further preferred exemplary embodiment of the method is characterized in that the protective torques in the region of the front axle and the rear axle are applied in such a way that an overlap between the vehicle and an obstacle is increased when the collision occurs. The ride level of the vehicle can be raised or lowered on one side as a function of the obstacle.

A further preferred exemplary embodiment of the method is characterized in that the protective torques are applied in the region of the front axle and the rear axle in such a way that an alternative crash structure is loaded when the collision occurs. This permits impact energy during the collision to be advantageously dissipated.

In the case of a system for alleviating the consequences of a collision of a vehicle which comprises a front axle and a rear axle with roll stabilization devices, with which opposing torques which counteract a rolling torque can be applied in the region of the front axle and the rear axle for the purpose of roll stabilization, the abovementioned object is alternatively or additionally achieved in that in the event of a collision the protective torques which alleviate the consequences of the collision are generated using the roll stabilization devices, in particular according to a method described above.

The invention also relates to a computer program product having a program code for carrying out a method described above. The computer program is executed, for example, in a control unit of the motor vehicle.

The invention also relates to a control unit for controlling roll stabilization having such a computer program product. The control unit advantageously interacts with a vehicle-surroundings-detection device and the roll stabilization devices of the vehicle.

The invention also relates to a motor vehicle having roll stabilization and having a control unit as described above. The roll stabilization comprises, for example, roll stabilization devices such as are disclosed in the German laid-open patent application DE 10 2010 010 869 A1, which is incorporated by reference.

BRIEF DESCRIPTION OF THE DRAWINGS

Further features, advantages and details of the invention can be found in the following description in which various exemplary embodiments are described in detail with reference to the drawing, in which.

DETAILED DESCRIPTION OF THE INVENTION

Figure 1:
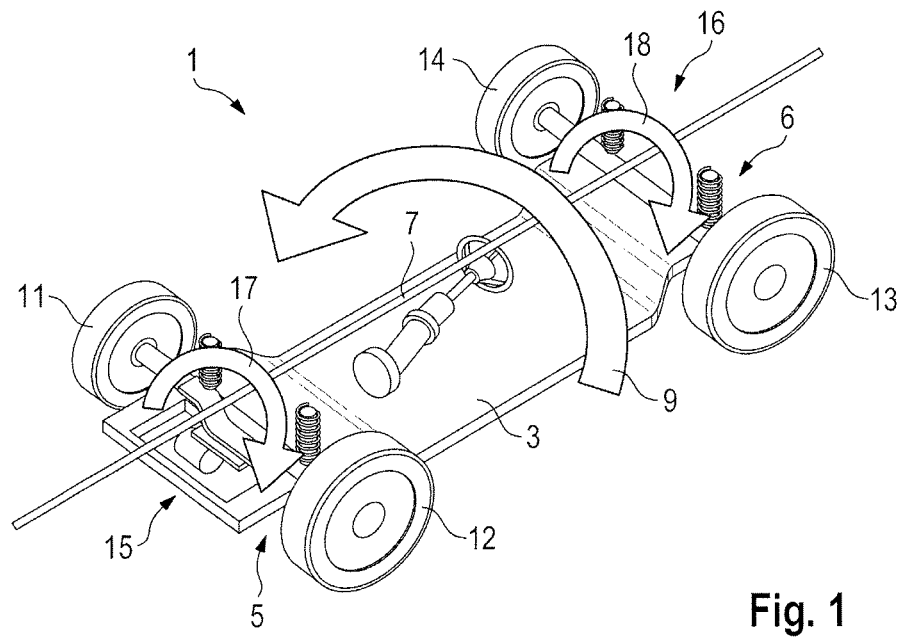
FIG. 1 shows a perspective illustration of a conventional vehicle having roll stabilization.

FIG. 1 is a simplified perspective illustration of a vehicle 1 having a vehicle bodywork 3. The vehicle 1 comprises a front axle 5 and a rear axle 6. A rolling axle 7 runs between the front axle 5 and the rear axle 6. A rolling torque, which occurs during operation of the vehicle 1 and acts around the rolling axle 7 is indicated by an arrow 9. The front axle 5 comprises suspension means (not denoted in more detail) for two front wheels 11 and 12. The rear axle 6 analogously comprises suspension means (not denoted either) for rear wheels 13, 14.

Furthermore, the front axle 5 comprises a roll stabilization device 15. The rear axle 6 comprises a roll stabilization device 16. Opposing torques which are generated by the roll stabilization devices 15, 16 are indicated by arrows 17, 18. The opposing torques 17, 18 counteract the rolling torque 9.

Figure 2:
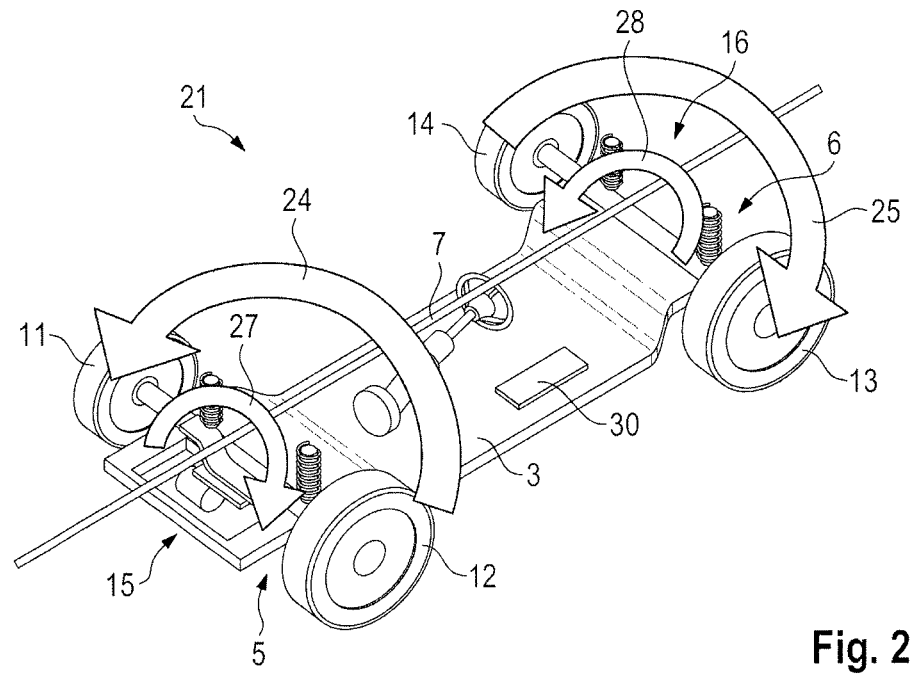
FIG. 2 shows the vehicle from FIG. 1, wherein arrows indicate how in the case of a collision protective torques which alleviate the consequences of the collision are generated using the roll stabilization.

FIG. 2 illustrates a similar vehicle 21 to that in FIG. 1. The same reference symbols are used to denote the same or similar parts. In order to avoid repetition, reference is made to the preceding description of FIG. 1.

In FIG. 2, torques which act on the vehicle 21 in the region of the front axle 5 and the rear axle 6 in the event of collision of the vehicle 21 are indicated by arrows 24, 25. The torque 24 acts in the region of the front axle 5. The torque 25 acts in the region of the rear axle 6 and is opposed to the torque 24.

The torques 24, 25 which act in opposing directions bring about torsion of the bodywork 3 of the vehicle 21 owing to a crash. The torques 24, 25 are triggered, for example, by asymmetrical crash events. The torsion of the vehicle 21 which is caused by the crash is undesired because it can bring about intrusions and deformations at the vehicle 21.

Protective torques which as a result of alternating responses of the roll stabilization bring about torsion of the vehicle bodywork 3 in opposition to the torsion 24, 25 owing to the crash are indicated by arrows 27, 28. As a result, undesired deformation of the vehicle bodywork 3 can be prevented or reduced.

A controller unit which is connected in terms of control (not illustrated) to the roll stabilization devices 15, 16 of the vehicle 21 is indicated by means of a rectangle 30. The protective torque 27 is applied in the region of the front axle 5 of the vehicle 21 using the roll stabilization device 15.

The protective torque 27 is opposed to the torque 24 owing to the crash. The protective torque 28 is applied in the region of the rear axle 6 of the vehicle 21 by means of the roll stabilization device 16. The protective torque 28 is opposed to the torque 25 owing to the crash.

The roll stabilization with the roll stabilization devices 15, 16 is also referred to as an anti-roll system. The anti-roll system serves to prevent undesired rolling movement of vehicle 1; 21 at the front axle 5 or the rear axle 6 about the rolling axis 7 of the vehicle 1; 21.

The roll stabilization devices 15, 16 comprise, for example, actuators which are embodied as hydraulic cylinders. Hydraulic pressure can be selectively applied to working spaces of the actuators in an alternating fashion via actuator lines, in order, for example, to minimize the rolling angle when the vehicle 1; 21 is cornering.

In the case of the vehicle 21, the roll stabilization devices 15, 16 are used to generate the protective torques 27, 28 in the event of a collision. The protective torques 27, 28 which are illustrated in FIG. 2 act in opposing directions. Therefore, the term alternating response of the roll stabilization is used.

The alternating response of the roll stabilization or of the anti-roll system serves to apply the opposing torque which is described above in order to counteract the undesired deformation of the vehicle bodywork 3.

In contrast to the illustrations, in the event of a collision rolling of the vehicle bodywork 3 of the vehicle 21 can also be applied on the same side using the roll stabilization devices 15, 16.

In the case of simultaneous rolling on the same side, protective torques are generated in the same direction with the roll stabilization devices 15, 16 and applied in the region of the front axle 5 and the rear axle 6 of the vehicle 21. Rolling of the vehicle 3 on the same side is helpful, for example, in providing a better overlap between vehicle bodywork 3 of the vehicle 21 and a crash barrier (not illustrated).

Figure 3A:
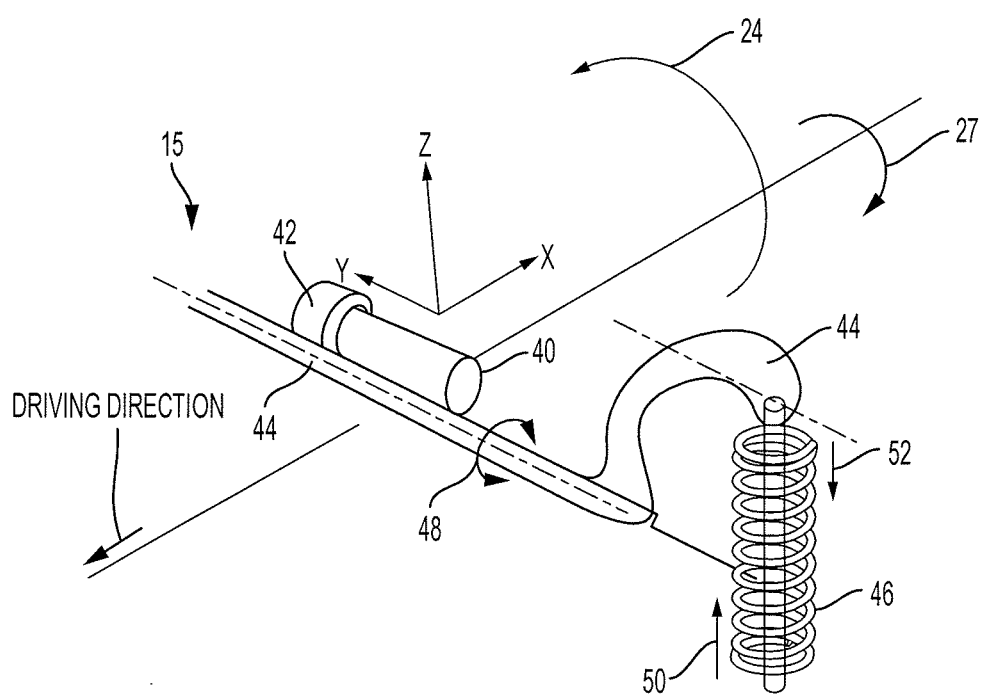
FIG. 3A depicts a schematic diagram of the roll stabilization device of the vehicle.
Figure 3B:
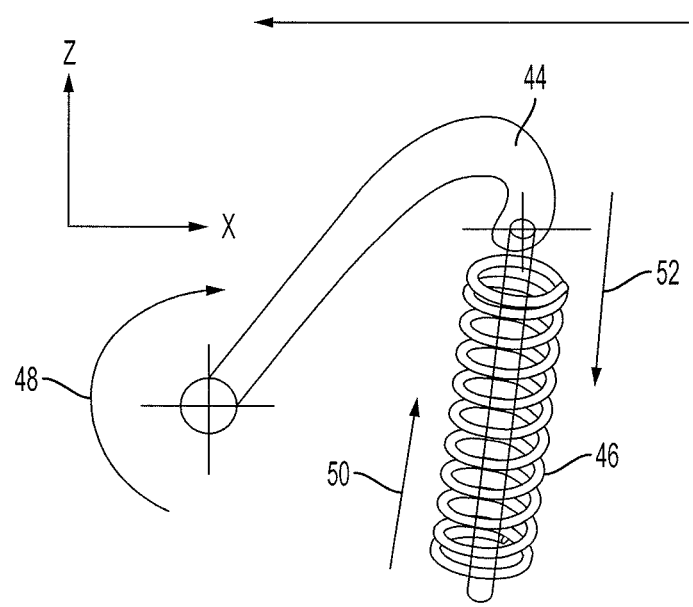
FIG. 3B depicts a schematic view of the roll stabilization device of the vehicle as viewed from one side.

FIG. 3A depicts a schematic diagram of the roll stabilization device 15 of the vehicle 21, and FIG. 3B depicts a schematic view a portion of the roll stabilization device 15 as viewed from one side. Although not described, it should be understood that roll stabilization device 16 shares the same structure and functionality as roll stabilization device 15.

Roll stabilization device 15 includes a drive unit 40, which may be an electric motor or a hydraulic actuator, for example. A gear box 42 is mounted to the output shaft of the drive unit 40. Gear box 42 is mechanically connected to an anti-roll bar 44 by gearing, for example. Anti-roll bar 44 is either connected to or associated with front axle 5 of vehicle 21. Anti-roll bar 44 is connected to the top end of the central rod of strut 46.

In operation, drive unit 40 rotates gear box 42, which rotates anti-roll bar 44 about axis 48, which causes strut 46 to either expand or contract (depending upon the rotational direction of drive unit 40) for counteracting the torque 24 owing to the crash. According to the example shown in FIGS. 3A and 3B, the torque 24 owing to a vehicle crash causes strut 46 to elongate in the direction of arrow 50. Concurrently, roll stabilization device 15 actuates drive unit 40 to rotate anti-roll bar 44 and cause strut 46 to retract in the opposite direction of arrow 50, which is shown by arrow 52, thereby equalizing the elongation of the strut 46 caused by the crash.

What is claimed is:

1. A method for alleviating the consequences of a collision of a vehicle having a front axle and a rear axle and at least one roll stabilization device with which torques can be applied in the region of the front axle and the rear axle for the purpose of roll stabilization,
wherein, in the event of a collision, protective torques are generated by the at least one roll stabilization device to alleviate the consequences of the collision, and
wherein, in the event of the collision, alternating protective torques are generated in the region of the front axle and the rear axle using the roll stabilization devices, which protective torques have directions of action which are opposed with respect to a rolling axle and which counteract torsion of the vehicle owing to the collision.

2. The method of claim 1 further comprising sensing an imminent collision using sensing devices prior to initiating the protective torques.

3. The method of claim 1 further comprising sensing of the collision either at the time of the collision or shortly after the collision using sensing devices and initiating the protective torques following the sensing.

4. The method of claim 1, wherein the protective torques are each generated by activating a drive unit, which causes rotation of an anti-roll bar, which causes translation of a strut that is associated with one of the front axle and the rear axle.

5. A system for alleviating consequences of a collision of a vehicle, which system comprises a front axle and a rear axle each having roll stabilization devices, with which opposing torques which counteract a rolling torque can be applied in a region of the front axle and the rear axle for the purpose of roll stabilization,
wherein, in the event of a collision, the roll stabilization devices are configured to generate protective torques which alleviate the consequences of the collision, and the roll stabilization devices are configured to generate alternating protective torques in the region of the front axle and the rear axle using the roll stabilization devices, which protective torques have directions of action which are opposed with respect to a rolling axle and which counteract torsion of the vehicle owing to the collision.

6. A computer program product having a program code for activating the roll stabilization devices of claim 5 to alleviate the consequences of the collision.

7. A control unit for controlling roll stabilization having the computer program product of claim 6.

8. A motor vehicle having roll stabilization and having the control unit as claimed in claim 7.

9. The system of claim 5, further comprising a drive unit for rotating an anti-roll bar that is connected to a strut that is associated with one of the front axle and the rear axle, wherein activation of the drive unit causes rotation of the anti-roll bar, which causes translation of the strut, which generates the protective torque.

* * * * *